United States Patent [19]

DeWoskin

[11] Patent Number: 4,592,118
[45] Date of Patent: Jun. 3, 1986

[54] FASTENERS FOR APPAREL AND METHODS OF MANUFACTURING THEM

[75] Inventor: Irvin S. DeWoskin, St. Louis County, Mo.

[73] Assignee: Barnhart Industries, Inc., Barnhart, Mo.

[21] Appl. No.: 553,105

[22] Filed: Nov. 18, 1983

[51] Int. Cl.[4] .................................. A44B 19/34
[52] U.S. Cl. ............................ 24/444; 24/432; 24/306; 24/90 HA; 24/DIG. 11; 128/501
[58] Field of Search ............... 24/432, 306, 304, 397, 24/398, 444, 447, 449, 443, 448, 450, 451, 452, 445, 446, 90 HA, 693, DIG. 11, 141; 128/425, 501

[56] References Cited

U.S. PATENT DOCUMENTS

| | | | |
|---|---|---|---|
| 2,096,750 | 10/1937 | Lawrence | 24/DIG. 11 |
| 2,411,328 | 11/1946 | MacNab | 24/DIG. 11 |
| 2,569,398 | 9/1951 | Burd et al. | 24/90 HA |
| 2,801,948 | 8/1957 | Walker | 24/141 |
| 2,900,983 | 8/1959 | Kleinman | 24/432 |
| 3,162,920 | 12/1964 | Durham | 24/DIG. 11 |
| 3,206,818 | 9/1965 | Knowlton | 24/90 HA |
| 3,241,881 | 3/1966 | Carnahan et al. | 24/306 |
| 3,378,013 | 4/1968 | Bruno | 128/501 |
| 3,464,417 | 9/1969 | Bucker | 128/501 |
| 3,580,793 | 5/1971 | Hewitt | 24/90 HA |
| 3,726,752 | 4/1973 | Provost | 24/DIG. 11 |
| 3,841,648 | 10/1974 | Meyer | 24/306 |
| 3,883,381 | 5/1975 | Thaeler | 24/432 |

FOREIGN PATENT DOCUMENTS

| | | | |
|---|---|---|---|
| 2256626 | 5/1973 | Fed. Rep. of Germany | 24/450 |
| 857747 | 1/1961 | United Kingdom | 128/501 |

*Primary Examiner*—Victor N. Sakran
*Attorney, Agent, or Firm*—Senniger, Powers, Leavitt and Roedel

[57] ABSTRACT

Bra-back fasteners parts and shoulder strap guards having hook and plush fastener elements, and methods of manufacturing them.

3 Claims, 7 Drawing Figures

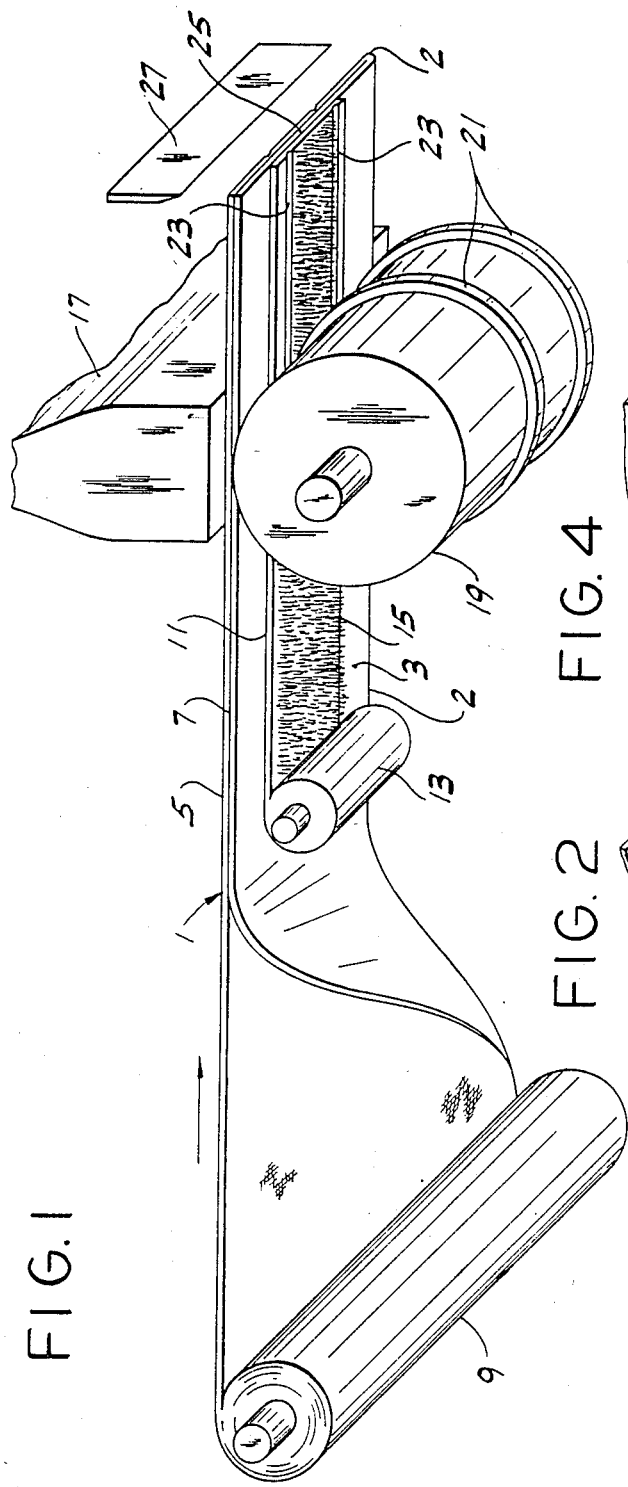
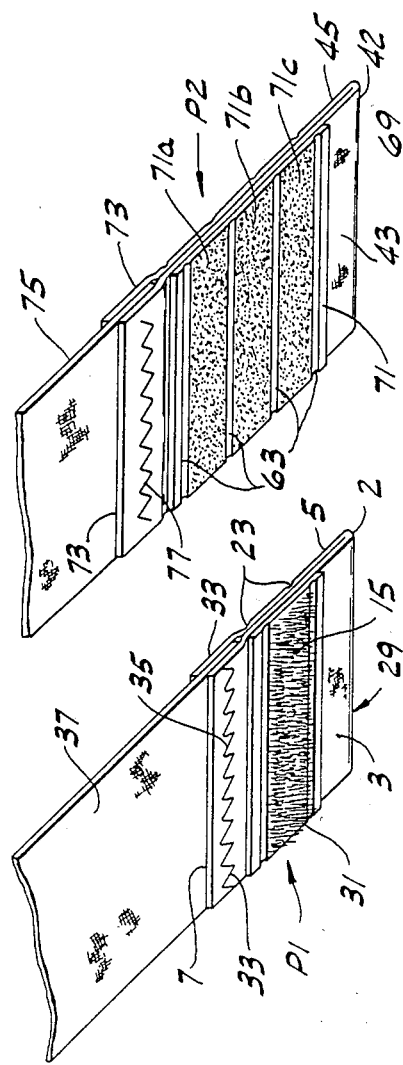
U.S. Patent  Jun. 3, 1986  Sheet 1 of 3  4,592,118
FIG. 1
FIG. 2
FIG. 4

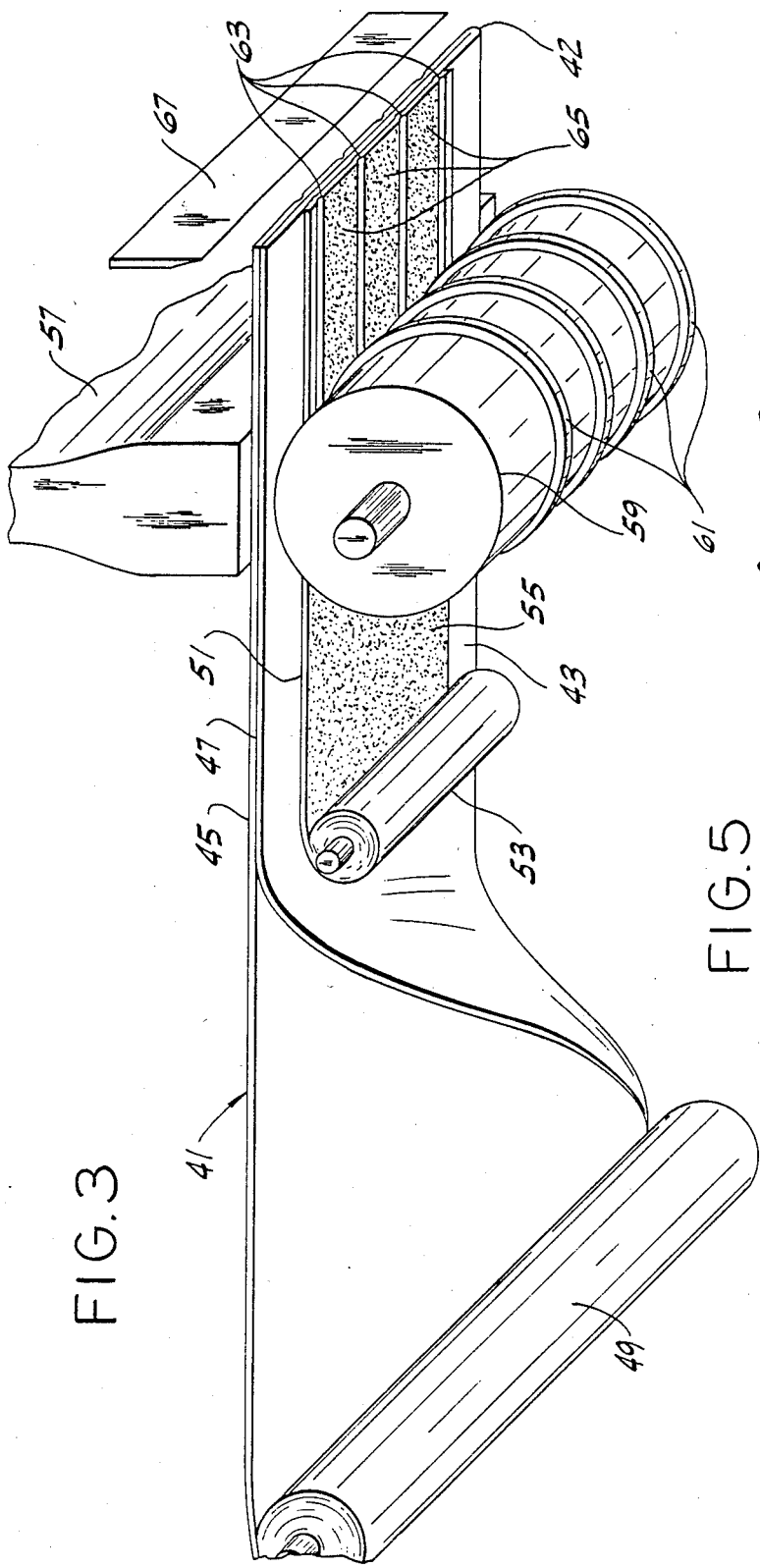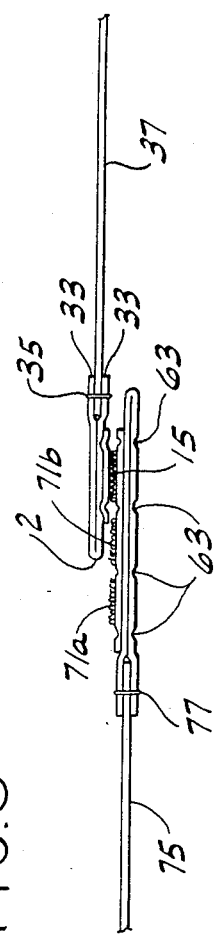

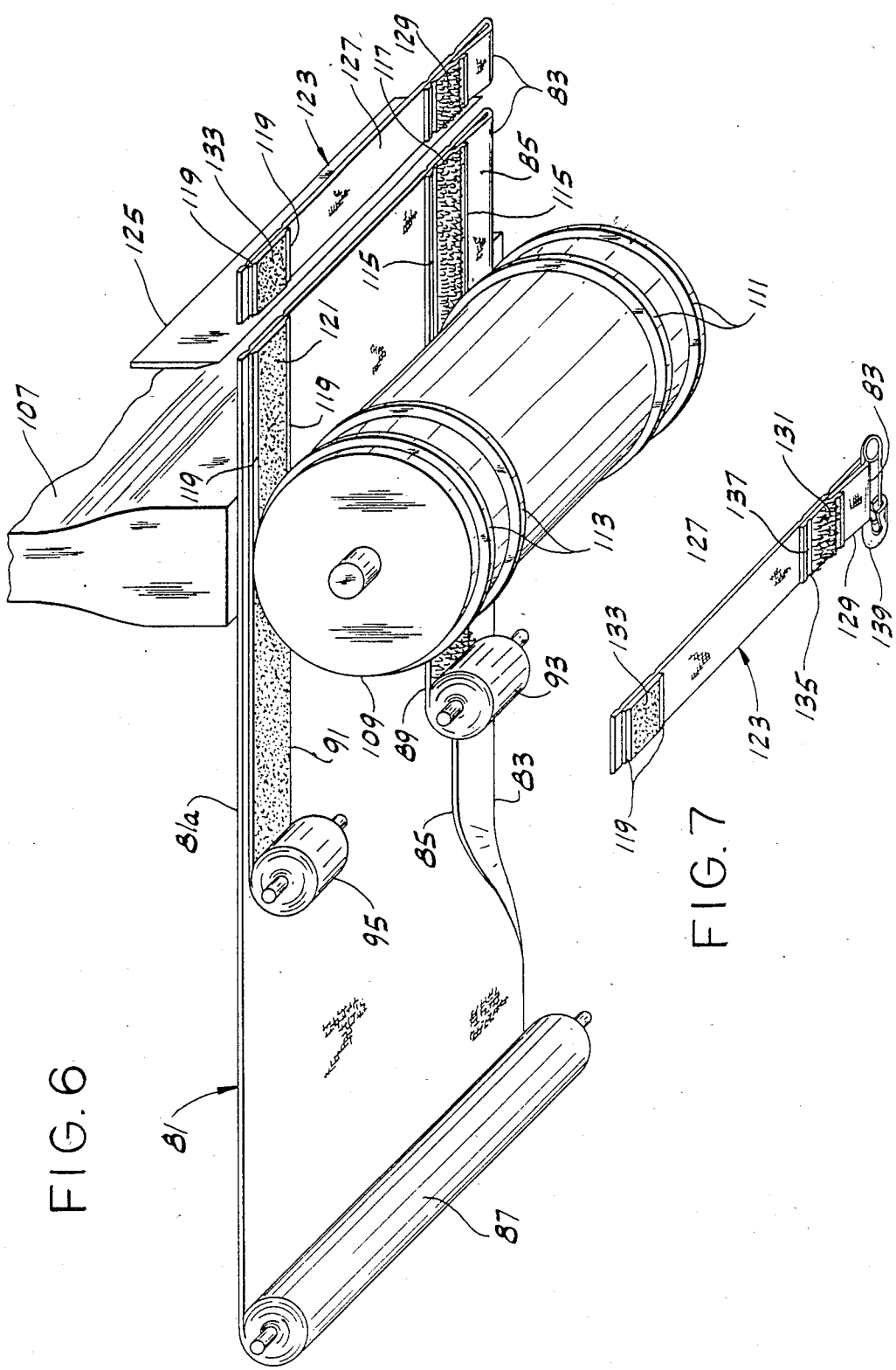

FASTENERS FOR APPAREL AND METHODS OF MANUFACTURING THEM

BACKGROUND OF THE INVENTION

This invention relates broadly to fasteners for apparel, and more particularly to bra-back fasteners, especially bra-back repair parts, and shoulder strap guards.

Prior bra-back fasteners, and especially bra-back repair parts, have metal hook and eye fasteners stitched in place, the stitching operations increasing the cost of manufacture. They are also difficult to fasten for some women, e.g., women suffering from arthritis, and the metal may cause irritation rubbing against the skin. Similarly, prior shoulder strap guards (lingerie guards) have metal snap fasteners, attachment of which and quality control over which increase the manufacturing cost.

SUMMARY OF THE INVENTION

Among the several objects of the invention may be noted the provision of improved fasteners for apparel, particularly bra-back fasteners, and especially bra-back repair parts, and shoulder strap guards, which do not have metal fastener elements such as metal hooks and eyes, or metal snap fastener elements, and which are relatively easy to use even by women with arthritis; and the provision of methods of manufacturing such fasteners at reduced cost.

In general, the method of this invention for making fastener elements for use with apparel comprises feeding forward a continuous base strip of material which is heat-sealable at least on one surface thereof, feeding forward a continuous fastener tape constituting one of a hook tape or a plush tape adapted to be releasably fastened together by pressing them together, said fastener tape being heat-sealable to the base strip, combining the fastener tape with the base strip as they are fed forward with the fastener tape extending longitudinally of the base strip on said surface of the latter, heat-sealing the fastener tape to the base strip on relatively narrow seals extending longitudinally of the fastener tape spaced transversely of the fastener strip, and segmenting the combined base strip and fastener tape on transverse lines at intervals spaced longitudinally thereof to form individual fastener elements each comprising a band of the base material having a segment of fastener tape material heat-sealed on one surface of the band by relatively narrow seals extending across the element from one side edge thereof to the other.

A fastener element of the invention for use with apparel comprises a band of flexible base material which is heat-sealable at least at one surface thereof and a segment of fastener tape material constituting one of a hook tape or a plush tape of heat-sealable material heat-sealed to said surface by relatively narrow seals extending across the element from one side thereof to the other.

Other objects and features will be in part apparent and in part pointed out hereinafter.

BRIEF DESCRIPTION OF THE DRAWINGS

FIG. 1 is a view illustrating the manufacture in accordance with this invention of a first part of a bra-back fastener or repair of the invention;

FIG. 2 is a view illustrating said first part;

FIG. 3 is a view illustrating the manufacture in accordance with this invention of a second part of the bra-back fastener or repair of the invention;

FIG. 4 is a view illustrating said second part;

FIG. 5 is a view on edge of the two parts fastened together;

FIG. 6 is a view illustrating the manufacture in accordance with this invention of a shoulder strap guard of the invention; and FIG. 7 is a view of the shoulder strap guard as completed.

Corresponding reference characters indicate corresponding parts throughout the several views of the drawings.

DESCRIPTION OF THE PREFERRED EMBODIMENTS

Referring to FIG. 1, there is generally indicated at 1 a continuous base strip of flexible material, which is ultrasonically heat-sealable at least on one surface thereof, being fed forward (from left to right). This strip is preferably a laminated strip comprising a central layer of polyurethane film laminated (under heat and pressure) between two outer layers of non-woven polyester material. As shown, this base strip is folded generally in half on fold line 2 extending longitudinally thereof to have two plies 3 and 5 which are open at one edge 7 of the folded strip and integrally joined along the fold line 2 at the other side edge thereof. Ply 3 is the lower ply and ply 5 is the upper ply as the strip feeds forward. Preferably the strip is supplied unfolded in a roll 9 and folded in half on line 2 as it is unwound from the roll and fed forward.

A continuous fastener tape 11, more particularly a VELCRO or VELCRO type hook fastener tape, is unwound from a roll 13, fed forward along with the base strip 1, and combined with the strip as the strip and tape are fed forward with the tape extending longitudinally of the strip on the bottom of the strip and with its hooks 15 on the underside. Tape 11 is ultrasonically heat-sealable for being ultrasonically heat-sealed to the strip 1, preferably being a nylon hook tape as is commercially available. It is narrower than the folded strip 1 and is combined with the folded strip 1 on the bottom of the folded strip extending generally centrally of the folded strip.

The combined folded base strip 1 and hook tape 11 feed forward between the horn 17 and wheel 19 of an ultrasonic sealing apparatus of the type shown in U.S. Pat. No. 3,666,599 and solo by Branson Sonic Power Company of Danburg, Conn. The wheel is formed with two annular peripheral ridges each designated 21 on its cylindrical surface spaced axially of the wheel a distance somewhat less than the width of the tape 11. The tape is generally centered transversely with respect to the two ridges so that it becomes ultrasonically sealed to the folded strip 1 on two lines of seal each designated 23 adjacent the side edges of the tape, leaving an unsealed portion 25 of the tape between the two lines of seal where the hooks 15 of the tape are intact.

The composite of the strip 1 and tape 11 produced as above-described is then segmented into individual fastener elements or parts such as indicated at P1 in FIG. 2 by cutting the composite on transverse lines at intervals spaced longitudinally thereof, as by means of a cutter such as indicated at 27 in FIG. 1. Each such part comprises a band 29 of the base material 1 and a segment 31 of the fastener tape material heat-sealed on one surface of the band by the relatively narrow lines of seal 23 extending across the part from one side edge thereof to the other.

The two plies 3 and 5 of the band 29 are free of one another at the side edge 7 opposite the fold 2. The seals at 23 secure the plies together. The part P1 has free margins 33 of the plies at edge 7 adapting it for being stitched as indicated at 35 in FIG. 2 to a back part 37 of a bra with the latter sandwiched between said free margins.

Referring to FIG. 3, there is generally indicated at 41 a continuous base strip of flexible material, which is ultrasonically heat-sealable at least on one surface thereof, being fed forward (from left to right). This strip is preferably a laminated strip like strip 1 but wider, comprising a central layer of polyurethane film laminated (under heat and pressure) between two outer layers of non-woven polyester material. As shown in FIG. 3, base strip 41 is folded generally in half on fold line 42 extending longitudinally thereof to have two plies 43 and 45 which are open at one edge 47 of the folded strip and integrally joined along the fold line 42 at the other side edge thereof. Ply 43 is the lower ply and ply 45 is the upper ply as the strip feeds forward. Preferably the strip is supplied unfolded in a roll 49 and folded in half on line 42 as it is unwound from the roll and fed forward.

A continuous fastener tape 51, more particularly a VELCRO or VELCRO type plush fastener tape, is unwound from a roll 53, fed forward along with the base strip 41, and combined with the strip as the strip 41 and tape 51 are fed forward with the tape extending longitudinally of the strip on the bottom of the strip and with its plush 55 on the underside. Tape 51 is ultrasonically heat-sealable for being ultrasonically heat-sealed to the strip 1, preferably being a nylon plush tape as is commercially available. It is somewhat narrower than the folded strip 41 and is combined with the folded strip 41 on the bottom of the folded strip extending generally in centered relation with respect to folded strip 41.

The combined folded base strip 41 and plush tape 51 feed forward between the horn 57 and wheel 59 of an ultrasonic sealing apparatus again of the above-mentioned type. The wheel is shown as formed with four annular peripheral ridges each designated 61 on its cylindrical surface spaced axially of the wheel. The tape, generally centered with respect to the folded strip 41, becomes ultrasonically sealed to the folded strip 41 on four lines of seal each designated 63 leaving three unsealed portions 65 of the tape between the four lines of seal where the plush 55 of the tape are intact.

The composite of the strip 41 and tape 51 produced as above-described is then segmented into individual fastener parts such as indicated at P2 in FIG. 4 by cutting the composite on transverse lines at intervals spaced longitudinally thereof, as by means of a cutter such as indicated at 67 in FIG. 3. Each such part comprises a band 69 of the base material 41 and a segment 71 of the plush tape material heat-sealed on a surface of the band by the relatively narrow lines of seal 63 extending across the part from one side edge thereof to the other, these lines of seal dividing the segment into three side-by-side plush zones 71a, 71b and 71c.

The two plies 43 and 45 of the band 69 are free of one another at the side edge 47 opposite the fold 42. The seals at 63 secure the plies together. The part P2 has free margins 73 of the plies at edge 47 and a band 75 of elastic material is sandwiched between these free margins and stitched thereto as indicated at 77 in FIG. 4.

For bra repair, or for original bra manufacture, the repair part P1 is stitched as indicated at 33 to the back of a bra at one side and the elastic band 75 of the repair part P2 is stitched to the back of the bra at the other side. The wearer may readily press together the hook zone 31 of part P1 and one of the plush zones 71a, 71b, 71c of part P2 as shown in FIG. 5 to fasten these parts together, the provision of the three plush zones providing for adjustment to fit the wearer.

Of special note is that the hook tape segment or zone 31 and the plush zones 71a, 71b and 71c are secured to the bands 29, 69 only by the seals 23, 63 extending transversely of the bands and are otherwise free of the bands throughout their extent from one side edge to the other. It has been observed that with the hook and plush zones free from the bands except at the seals (23, 63) extending transversely of the bands, the parts cling better together and are less prone to separate, in relation to an arrangement in which the hook and plush zones are secured completely around their edges (i.e., at the ends as well as the sides) to the bands.

Referring now to FIG. 6, there is generally indicated at 81 a continuous base strip of flexible material, which is ultrasonically heat-sealable on both surfaces thereof, being fed forward (from left to right). This strip may be of the same material as above-described three-layer laminate used for the manufacture of the bra-back repair parts, but is substantially wider than the strips used in the manufacture of the bra-back repair parts. As strip 81 is fed forward, it is folded on a fold line 83 to have a relatively narrow margin 85 folded under on the bottom of the strip at one side of the strip. The strip is supplied unfolded in a roll 87 and folded on the line 83 as it is unwound from the roll and fed forward. A continuous VELCRO or VELCRO type hook fastener tape 89 and a continuous VELCRO or VELCRO type plush fastener tape 91 are unwound from respective rolls 93 and 95, fed forward along with the base strip 81 and combined with the strip as the strip and tapes are fed forward, with the tapes extending longitudinally of the strip on the bottom of the strip and with the hook and plush sides 97 and 99 of the tapes facing down. Each tape is ultrasonically heat-sealable for being ultrasonically heat-sealed to the strip 81, preferably being nylon hook and plush tapes as are commercially available. Each tape is relatively narrow. One of them, e.g., the hook tape 89 is combined with the strip 81 up against the folded-under margin 85 overlapping the edge of the latter and extending inwardly therefrom. The other tape, i.e., the plush tape 91, is combined with the strip 81 on the underside of strip 81 adjacent the edge 81a of strip 81 opposite the fold 83.

The combined base strip 81 (with the folded-under margin 85) and the tapes 89 and 91 feed forward between the horn 107 and wheel 109 of an ultrasonic sealing apparatus as above-described. The wheel is formed with two circular peripheral ridges each designed 111 on its cylindrical surface adjacent one end of the wheel for sealing the hook tape 89 to the strip, and with two annular peripheral ridges each designated 113 on its cylindrical surface adjacent the other end of the wheel for sealing the plush tape 91 to the strip. The tape 89 is generally centered transversely with respect to ridges 111, which are spaced axially a distance somewhat less than the width of tape 89, so that the tape 89 becomes sealed to the strip on two lines of seal 115 adjacent the side edges of the tape, leaving an unsealed portion 117 of the tape between the two lines of seal where the hooks of the tape are intact. The outer one of these two lines of seal 115 seals the folded-under margin 85 to the strip 81 proper. The tape 91 is generally centered transversely with respect to the ridges 113, which are spaced axially a distance less than the width of the tape 91, so that the tape becomes sealed to the strip 81 on two lines of seal 119, leaving an unsealed portion 121 of the tape between the two lines of seal where the plush of the tape is intact.

The composite of the strip 81 and the tapes 89 and 91 produced as above-described is segmented into individual shoulder strap guards such as indicated at 123 in FIGS. 6 and 7 by cutting the composite on transverse lines at relatively narrow intervals spaced longitudinally thereof, as by means of a cutter such as indicated at 125 in FIG. 6. Referring to FIGS. 6 and 7, each such guard is shown to comprise the relatively narrow band 127 of heat-sealable material (derived from strip 81), an end portion 129 of which (derived from margin 85) is folded over on the fold line 83 extending across the band adjacent one end of the band and overlying one face of the band, said fold line constituting one end of the guard. A segment 131 of the heat-sealable hook fastener material (derived from tape 93) and a segment 133 of the heat-sealable plush fastener material (derived from tape 95) are heat-sealed to the band. One of said segments, namely the segment 127, overlies said folded-over end portion 129 of the band and is heat-sealed thereto by heat seal 135 spaced inwardly from said fold line 83, said folded-over end portion being heat-sealed to the band at this heat seal, and by a heat seal 137. The folded-over end portion 129 forms a loop at said one end of the guard for receiving a safety pin 139. The other of said segments, namely 133, is heat-sealed to said band adjacent the other end of the band on lines 119. The band is adapted to be folded around a shoulder strap on a fold line extending across the band between the two segments 131, 133 to bring the hook material and plush material segments together, and the band is adapted to be secured around the strap by pressing together the said hook material and plush material segments. The safety pin is used to pin the band to the user's dress, as will be readily understood.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A bra back fastener element comprising a band of flexible base material which is heat-sealable at least at one surface thereof and a segment of fastener tape material constituting one of a hook tape or a plush tape of heat-sealable material heat-sealed to said surface by relatively narrow seals extending across the element from one side thereof to the other, wherein the band of based material is a two-ply band with plies having free margins at one end of the band for stitching thereof to another part with the latter received between said free margins.

2. A fastener element as set forth in claim 1 wherein the tape is a hook tape heat-sealed to the band of base material on two lines of seal adjacent the side edges of the tape.

3. A fastener element as set forth in claim 1 wherein the tape is a plush tape heat-sealed to the band of base on at least three lines of seal forming at least two side-by-side plush zones.

* * * * *